United States Patent [19]
Okada

[11] Patent Number: 5,810,600
[45] Date of Patent: Sep. 22, 1998

[54] VOICE RECORDING/REPRODUCING APPARATUS

[75] Inventor: Toshio Okada, Tokyo, Japan

[73] Assignee: Sony Corporation, Tokyo, Japan

[21] Appl. No.: 48,503

[22] Filed: Apr. 20, 1993

[30] Foreign Application Priority Data

| Apr. 22, 1992 | [JP] | Japan | 4-102840 |
| Apr. 24, 1992 | [JP] | Japan | 4-106884 |
| Apr. 25, 1992 | [JP] | Japan | 4-131771 |
| Apr. 30, 1992 | [JP] | Japan | 4-137845 |

[51] Int. Cl.$^6$ ............................................. G09B 19/04
[52] U.S. Cl. .................. 434/185; 434/156; 434/169; 434/318; 434/321; 704/1; 704/200
[58] Field of Search ................. 434/156, 157, 434/169, 185, 307, 308, 318–321, 323, 350; 364/419.01, 419.19, 419.2; 395/250, 425, 927; 369/30, 33; 360/18, 19.1

[56] References Cited

U.S. PATENT DOCUMENTS

| 3,913,135 | 10/1975 | Damlamian | 434/308 X |
| 3,936,595 | 2/1976 | Yanagimachi et al. | 434/307 X |
| 4,406,626 | 9/1983 | Anderson et al. | 434/308 X |
| 4,468,204 | 8/1984 | Scott et al. | 434/321 X |
| 4,734,795 | 3/1988 | Fukami et al. | 360/8 |
| 4,749,354 | 6/1988 | Kerman | 434/318 X |
| 4,804,328 | 2/1989 | Barrabee | 434/319 X |
| 4,959,734 | 9/1990 | Foster | 434/318 X |
| 5,008,942 | 4/1991 | Kikuchi | 434/307 X |
| 5,010,495 | 4/1991 | Willetts | 434/185 X |
| 5,106,097 | 4/1992 | Levine | 434/319 X |
| 5,239,430 | 8/1993 | Koishikawa et al. | 360/19.1 |

Primary Examiner—Joe Cheng
Attorney, Agent, or Firm—Frommer Lawrence & Haug LLP; William S. Frommer

[57] ABSTRACT

A voice recording/reproducing apparatus suitable for use in a language laboratory operates with a disk on which are recorded text segments comprising sentences and a table of contents containing text and sentence addresses. Automatic sensing of the division points between sentences in each of the text sections can be performed. Only the end portion of a sentence may be readily reproduced, and the division point following the sentence may be finely adjusted. Desired audio data may be quickly retrieved by rough retrieval operations, in which the time code is advanced or reversed by a large amount, followed by fine retrieval operations, in which the time code is advanced or reversed by a small amount. One of several pronunciation practice modes may be selected. A reduced reproduction speed capability allows a student to hear fine pronunciation of words with an invariant pitch.

15 Claims, 6 Drawing Sheets

VOICE RECORDING/REPRODUCING APPARATUS

FIELD OF THE INVENTION

This invention relates to a voice (audio data) recording/reproducing apparatus adapted for carrying out recording/reproduction of audio data by using a disk, which is suitable for use in, e.g., learning or study of a foreign language, etc.

DESCRIPTION OF THE PRIOR ART

As a conventional voice (audio data) recording/reproducing apparatus, e.g., so called a LL (Language Laboratory) learning machine adapted for carrying out learning of a foreign language is known. Further, a collective (group) learning apparatus adapted so that terminal equipments are installed respectively for a teacher and a plurality of students is known in e.g., U.S. Pat. No. 4,310,317.

In this LL learning machine, a master tape comprised of, e.g., a magnetic tape is used as teaching materials. This master tape is prepared, e.g., by allowing a teacher to record a voice (pronunciation of words) serving as a model into the recording region of the left channel. The voice is recorded on this master tape in a manner divided every learning items, and edited so as to have idle (empty) areas between respective learning items.

It is to be noted that the above-mentioned LL learning machine has a retrieval function to carry out retrieval of a desired learning item by detecting an idle area provided between the learning items. The teacher prepares the master tape thereafter to search for the leading position, etc. every learning item by using the above-mentioned retrieval function to examine whether or not correct editing is carried out. It is now assumed that the master tape is completed when it is judged that there is no abnormal state in all learning items.

On the other hand, in carrying out learning or study, the student selects a desired learning item from the learning items by using the above-mentioned retrieval function to reproduce the selected learning item. Thus, a voice of the teacher corresponding to the selected learning item is produced from a speaker unit for left channel. The student listens to the voice of the teacher produced from the speaker unit for left channel to carry out exercise of pronunciation, etc. following that voice (pronunciation of words). In addition, the student records, onto the master tape, a voice of the student himself corresponding to words that the student has pronounced following the pronunciation of the teacher to reproduce it therefrom to listen to the pronunciation of the teacher and the pronunciation of the student himself in a comparative manner to carry out the exercise of pronunciation so that the student can pronounce words in a manner as close as the pronunciation of the teacher, etc.

It is to be noted that a voice that the student records is adapted to be recorded at the right channel of the master tape, and voice of the teacher recorded at the left channel is adapted so that it is not erased.

However, since the above-described conventional voice (audio data) recording/reproducing apparatus serving as a LL learning machine is adapted to record a voice onto the magnetic tape so as to have predetermined idle (vacant) times between respective learning items to carry out retrieval of a desired learning item by detecting such predetermined idle time, in the case where, e.g., a desired learning item is recorded at the terminating portion of a master tape, it was required to carry out a fast feed to wind a tape to some extent thereafter to carry out the retrieval. For this reason, when the teacher examines as to whether or not a master tape prepared by the teacher is correctly edited, and when the student retrieves a desired learning item, such a work was very troublesome and requires much time.

While recording of voice is made in such a manner that there is a predetermined idle time between the learning items (point of division). This point of division is important in carrying out a retrieval of a desired learning item. Accordingly, the master tape is assumed to be completed after whether or not the respective learning items are precisely divided is examined. For this reason, it is expected to develop such a voice (audio data) recording/reproducing apparatus capable of easily confirming whether or not the above-mentioned point of division is suitable.

Further, since the above-described voice (audio data) recording/reproducing apparatus serving as a LL learning machine uses a master tape on which recording of voice is carried out so that there take place predetermined idle or vacant times between words pronounced, when one word is pronounced, the student could only carry out learning of one pattern to conduct the exercise of pronunciation within the predetermined idle time following the pronounced word pronounced. Generally, learning methods suitable for individual persons are conceivable. Accordingly, it cannot be said that the above-mentioned learning method of one pattern is necessarily suitable.

Further, the above-described conventional voice (audio data) recording/reproducing apparatus uses the magnetic tape as a recording medium. Accordingly, in order to retrieve desired audio data, an approach was employed to repeatedly carry out an operation to conduct, e.g., fast feed or rewinding to carry out reproduction at an arbitrary portion to carry out retrieval of desired audio data, or the like. For this reason, it took much time in retrieval of the desired audio data.

In addition, in the case of the above-described conventional voice (audio data) recording/reproducing apparatus serving as a LL learning machine, in order to facilitate to carry out retrieval of a desired learning item, it was necessary to provide predetermined idle or vacant areas between respective learning items. For this reason, there was employed a method of manually dividing audio data such that when recording of audio data of one learning item is completed, fast feed is carried out to ensure an idle area as described above thereafter to start recording of audio data of the next learning item, or when recording of audio data of one learning item is completed, recording of silence is carried out as it is for a predetermined time to start recording of audio data of the next learning item after the predetermined time has passed. Accordingly, it took much labor.

OBJECTS

A first object of this invention is to provide a voice (audio data) recording/reproducing apparatus capable of easily confirming the recorded content at respective points of division of an audio signal recorded in a manner divided into a plurality of sentences.

A second object of this invention is to provide a voice (audio data) recording/reproducing apparatus capable of easily selecting pronunciation practice modes suitable for respective individual persons.

A third object of this invention is to provide a voice (audio data) recording/reproducing apparatus capable of retrieving desired audio data in a short time.

A fourth object of this invention is to provide a voice (audio data) recording/reproducing apparatus capable of automatically dividing recorded audio data into a plurality of sentences.

SUMMARY OF THE INVENTION

To achieve the first object, this invention provides a voice (audio data) recording/reproducing apparatus adapted for recording and reproducing an audio signal, which comprises recording/reproducing means for recording an audio signal onto a disk-shaped recording medium and reproducing it therefrom, input means adapted so that an indication signal is inputted thereto through an operation unit, and control means for controlling the operation of the recording/reproducing means on the basis of the indication signal inputted from the input means, the control means being operative to control the recording/reproducing means so that start addresses and end address of a plurality of sentences obtained by dividing the audio signal recorded on the disk-shaped recording medium are recorded onto the disk-shaped recording medium, and to control the recording/reproducing means so that when a sentence end reproduction indication signal is delivered from the input means, an audio signal of a predetermined time at the terminating portion of a sentence indicated by the indication signal of the sentences is reproduced.

To achieve the second object, this invention provides a voice (audio signal) recording/reproducing apparatus for recording and reproducing an audio signal, which comprises recording/reproducing means for carrying out an operation to reproduce, from a disk-shaped recording medium, an audio signal as a text divided into a plurality of sentences, and a recording/reproducing operation to record an audio signal indicating a voice that an operator has made onto the disk-shaped recording medium and reproducing it therefrom, input means adapted so that a recording/reproducing mode indication signal is inputted thereto through an operation unit, and control means for controlling the recording/reproducing means so that the operation for reproducing an audio signal as a text and the operation for recording or reproducing an audio signal indicating voice that the operator has made are carried out in order corresponding to the recording/reproducing mode indication signal inputted from the input means.

To achieve the third object, this invention provides a voice (audio signal) recording/reproducing apparatus for recording and reproducing an audio signal, which comprises recording/reproducing means for recording an audio signal onto a disk-shaped recording medium and reproducing it therefrom, input means adapted so that an indication signal is inputted thereto through an operation unit, and control means for controlling the operation of the recording/reproducing means on the basis of the indication signal inputted from the input means, the control means being operative to control the recording/reproducing means so that start addresses and end addresses of a plurality of sentences obtained by dividing the audio signal recorded on the disk-shaped recording medium are recorded onto the disk-shaped recording medium, and to control the recording/reproducing means so that the reproducing position of the audio signal on the disk-shaped recording medium is moved by a predetermined spacing when a skip indication signal is delivered from the input means.

To achieve the fourth object, this invention provides a voice (audio signal) recording/reproducing apparatus for recording and reproducing an audio signal, which comprises recording/reproducing means for recording an audio signal onto a disk-shaped recording medium and reproducing it therefrom, input means adapted so that an indication signal is inputted thereto through an operation unit, and control means for controlling the operation of the recording/reproducing means on the basis of the indication signal inputted from the input means, thus to reproduce the audio signal recorded on the disk-shaped recording medium when a sentence automatic division indication signal is inputted from the input means to detect a silent portion of a predetermined time or more to control the recording/reproducing means on the basis of the detected result so that data indicating a point of division of sentence is recorded at the position earlier by a predetermined time from the leading portion of an audio signal recorded after the silent portion when that silent portion is detected.

DETAILED DESCRIPTION OF THE PREFERRED EMBODIMENTS

Preferred embodiments of a voice (audio data) recording/reproducing apparatus according to this invention will now be described with reference to the attached drawings.

Figure 1:
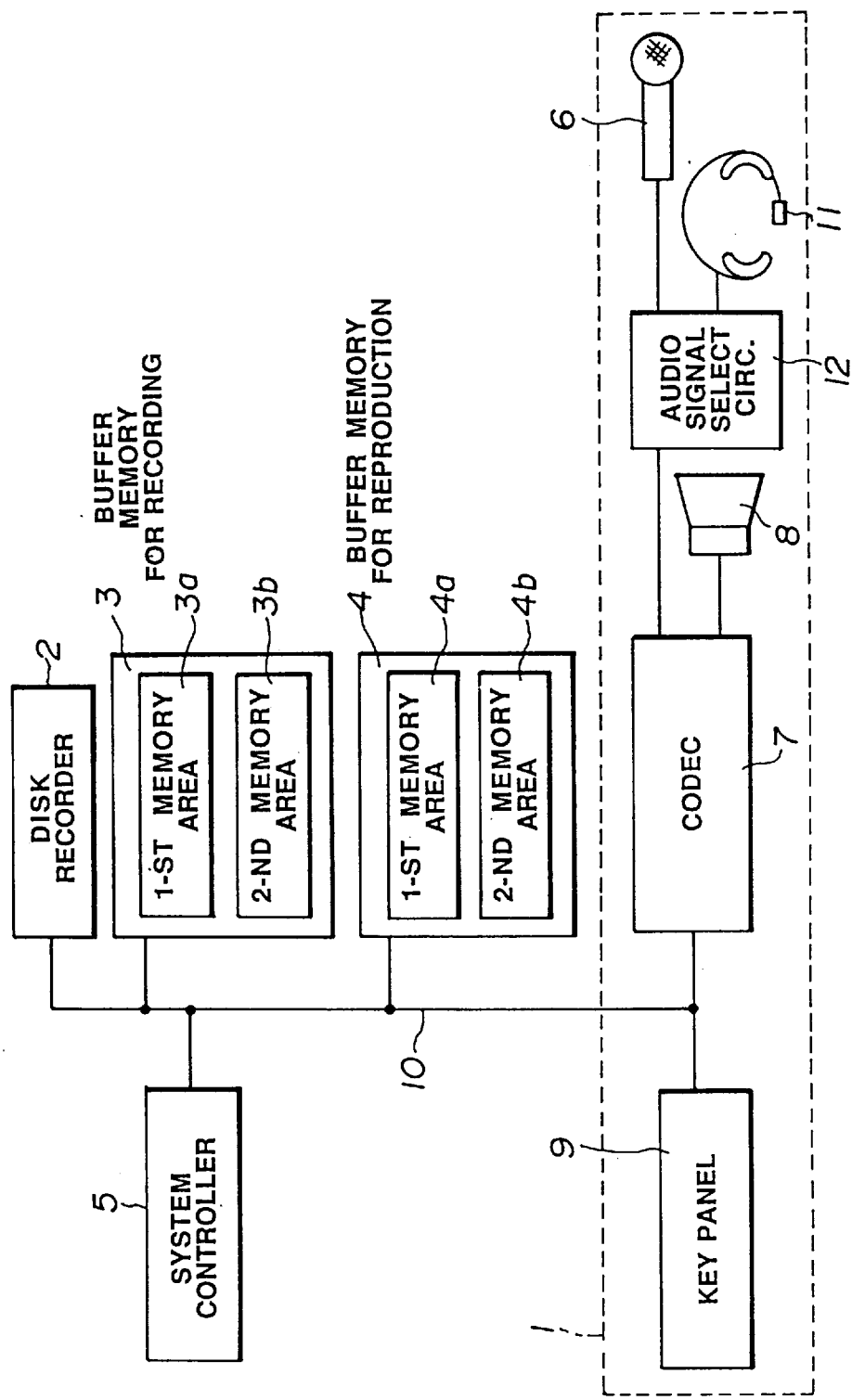
FIG. 1 is a block diagram showing an embodiment of a voice recording/reproducing apparatus of this invention.

A voice (audio data) recording/reproducing apparatus according to an embodiment includes, as shown in FIG. 1, for example, an operation unit 1 for controlling recording/reproduction of audio data, a disk recorder 2 for recording audio data onto a hard disk or a magneto-optical disk serving as a disk-shaped recording medium, or reproducing audio data therefrom, a buffer memory 3 for recording and a buffer memory 4 for reproduction serving as memory means for temporarily storing audio data delivered from the operation unit 1 and audio data delivered from the disk recorder 2, and a system controller 5 serving as control means for controlling the operation of the entirety of the voice (audio data) recording/reproducing apparatus.

The operation unit 1 is composed of a key panel 9 on which a plurality of keys relating to recording/reproduction of audio data are provided, a microphone 6 for inputting voice, a head set 11 used when, e.g., the student inputs voice (audio data), an audio signal selection circuit 12 for selectively outputting an audio signal from the microphone 6 or that from the head set 11, a codec 7 (combination of a coder and a decoder) for converting an audio signal as an analog signal from the audio signal selection circuit to a corresponding digital signal to form audio data to deliver this audio data to the recording buffer memory 3, and converting audio data delivered through the reproducing buffer memory 4 from the disk recorder 2 to a corresponding analog signal to form an audio signal, and a speaker unit 8 for making pronunciation in dependency upon the audio signal from the codec 7.

Figure 2:
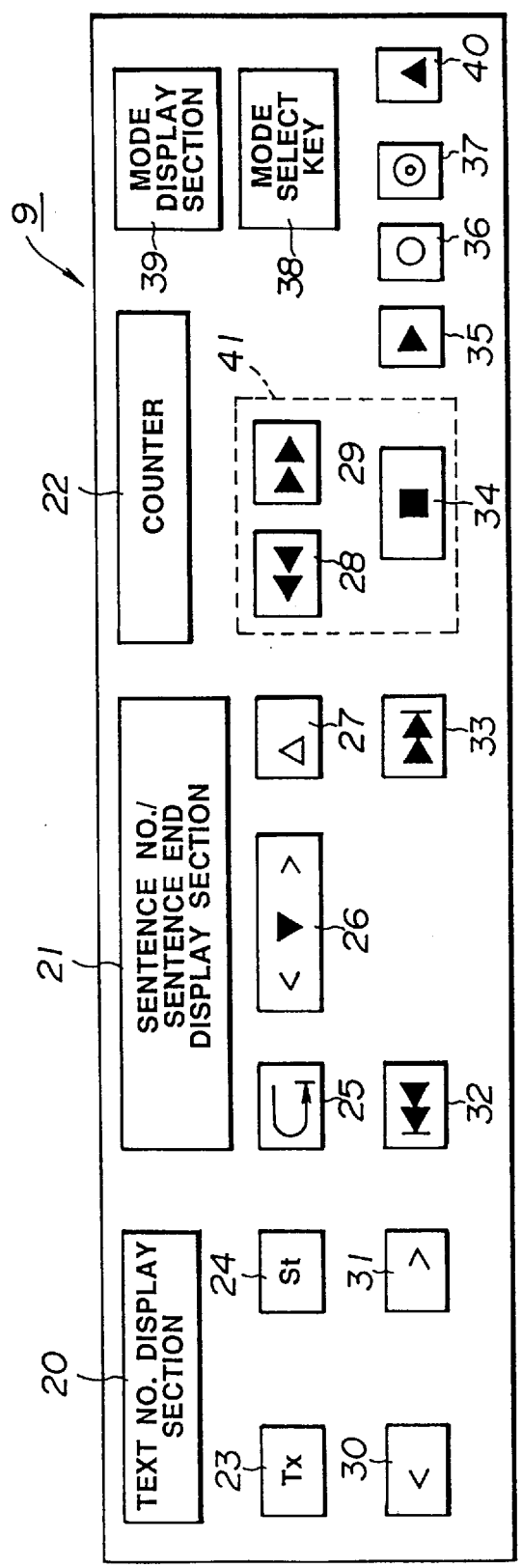
FIG. 2 is a schematic diagram showing an embodiment of a key panel of the voice recording/reproducing apparatus shown in FIG. 1.

On the key panel 9, as shown in FIG. 2, for example, there are provided a text No. display section 20 for displaying No. of audio data (text) in a reproducing area of one unit of audio data recorded on the hard disk or the magneto-optical disk, a sentence No./sentence end display section 21 for displaying No. of audio data (sentence) in the partial reproducing area formed by dividing audio data of the text into a plurality of data segments and a sign indicating end (termination) of the sentence, a counter 22 for displaying an elapsed time, etc. at the time of recording or at the time of reproduction, a text delete key 23 for deleting the text, a sentence delete key 24 for deleting the sentence, a sentence end reproduction key 25 for reproducing audio data of a last predetermined time of that sentence, a sentence division/fine adjustment key 26 for dividing the sentence into two sentence segments and finely adjusting the terminating position (point of division) of the sentence, and a sentence connection key 27 for connecting two sentences.

On the key panel 9, there are further provided a quick reverse key 28 for carrying out a quick reverse operation, a quick advance key 29 for carrying out quick advance operation, a test reverse key 30 for reproducing a text before the current (present) text, a text advance key 31 for reproducing a text after the current (present) text, a sentence reverse key 32 for reproducing a sentence before the current (present) text, a sentence advance key 33 for reproducing a sentence after the current (present) text, a stop key 34 for designating stop of reproduction, a reproduction key 35 for designating reproduction, a recording key 36 for carrying out an ordinary recording, and a voice responsive recording key 37 for carrying out a voice responsive recording which will be described later.

In this embodiment, in order to carry out an editing such that the above-mentioned respective keys provided on the key panel 9 are used to divide audio data recorded on the hard disk or the magneto-optical disk into audio data of text, and to divide the audio data of text into audio data of sentence, the key panel 9 itself serves as editing means.

The voice recording/reproducing apparatus according to this embodiment is characterized in that, in carrying out editing as described above by using respective keys of the key panel 9 serving as the editing means, the system controller 5 serving as the control means controls the disk recorder 2 so as to record recording start addresses and recording end addresses of audio data divided into texts and sentences onto the hard disk or the magneto optical disk, and that when the sentence end reproduction key 25 provided on the key panel 9 is turned ON, the system controller 5 detects this ON operation to control the disk recorder 2 so as to reproduce audio data of a last predetermined time of audio data of that sentence.

The buffer memory 3 for recording and the buffer memory 4 for reproduction are comprised of a semiconductor memory, e.g., RAM, etc., and include first and second memory areas 3a, 3b and first and second memory areas 4a, 4b, respectively.

The first and second memory areas 3a, 3b of the buffer memory 3 for recording and the first and second memory areas 4a, 4b of the buffer memory 4 for reproduction have respectively capacities of, e.g., 4096 bytes (8192 bytes in total). For this reason, assuming that there is provided a codec 7 as described above to apply A/D conversion to an audio signal delivered from, e.g., the microphone 6 at 64K bps (8K bytes/sec.) to output the digital signal thus obtained, audio data respectively having data lengths of 0.512 seconds are stored into the first and second memory areas 3a, 3b of the buffer memory 3 for recording, respectively.

The buffer memory 3 for recording and the buffer memory 4 for reproduction are such that when transmission and reception of data are carried out between the codec 7 having a relatively low data transfer rate of, e.g., 64K bps and the disk recorder 2 having a transfer rate several ten times larger than that of the codec 7, they temporarily preserve (store) data of a fixed quantity, thus to perform the role of a buffer for transfer rate conversion.

The hard disk provided in the disk recorder 2 is adapted so that data can be recorded onto, e.g., the both surfaces and reproduced therefrom. Assuming that the codec 7 having a data transfer rate of 64K bps (=8K bytes/seconds) is used, the memory capacity is equal to about one hour and 28 minutes (42.1M bytes/seconds=5262.5 seconds≈one hour and 28 minutes).

It is to be noted that a partial recording area of the recording area of one hour and 28 minutes is formed as an edit data recording area for recording so called TOC (Table of Contents) data such as recording start addresses and recording end addresses, etc. of audio data of the text and the sentence. When it is assumed that, e.g., the registration limit number of the text is 50, the registration limit number of the sentence within respective texts is 100, and the sector number is set to a value so that data capacity of 3 bytes can be preserved, the edit data area has a quantity of data of about 15000 bytes (about 30 sectors corresponding to voice of about 2 seconds).

In correspondence with the above, the disk recorder 2 is a disk recorder adapted so as to carry out recording/reproduction of a hard disk such that recording/reproduction can be conducted on the both sides, and is of a structure capable of carrying out, e.g., two hard disks as described above. In order to realize this, the disk recorder 2 includes four recording/reproducing systems in total of two recording/reproducing systems for carrying out recording/reproduction respectively provided on the upper side and the lower side of one hard disk, and two recording/reproducing systems for carrying out recording/reproduction respectively provided on the upper surface side and the lower surface side of the other hard disk.

Further, the disk recorder 2 has, e.g., a specification such that the number of data cylinders is 624, the number of sectors per one track is 33, the number of bytes per sector is 512, the capacity of the format is 42.1M (bytes), the data transfer rate is, e.g., 10M bytes/seconds at the maximum, the maximum access time is a value less than 65 mS, the mean access time is a value less than 29 mS, the access time between tracks is a value less than 8 mS, the spindle rotation number is 3600 rpm, and the mean waiting time is 8.3 m seconds.

It is to be noted that the stop key 34, the quick reverse key 28, and the quick advance key 29 constitute a skip key 41. When the quick reverse key 28 or the quick advance key 29 is turned ON while allowing the stop key 34 to be turned ON, the system controller 5 detects this ON operation to control the disk recorder 2 so as to reverse (withdraw) or advance the reproducing position of audio data recorded on the hard disk or the magneto optical disk with a predetermined spacing every time the quick reverse key 28 or the quick advance key 29 is turned ON.

The voice recording/reproducing apparatus according to this embodiment constituted as above can be used as, e.g., a LL (Language Laboratory) learning machine for learning a foreign language. In order to use such an apparatus as a LL learning machine, it is first required to prepare a master disk which constitutes a model on which audio data such as pronunciation, etc. by a teacher is recorded.

In order to record a voice of the teacher to prepare a master disk, the teacher allows the reproduction key 35 and the recording key 36 provided on the key panel 9 shown in FIG. 2 to be turned ON at the same time to carry out inputting of voice by the microphone 6.

The microphone 6 collects voice of the teacher to form, from the collected voice, an audio signal which is an analog signal to deliver it to the codec 7.

The codec 7 applies A/D conversion to an audio signal from the microphone 6 every 125μ sec. in synchronism with a timing signal of, e.g., 8 KHz from the system controller 5 to form audio data having, e.g., 8 bits as a unit to output it. This audio data is delivered to the recording buffer memory 3 through a bus line 10.

The system controller 5 responds to an interruption request by the timing signal of 8 KHz to control the buffer memory 3 for recording so as to store the audio data outputted from the codec 7 into the first memory area 3a or the second memory area 3b.

As described above, the first and second memory areas 3a, 3b respectively have data areas of 0.512 seconds (4096 bytes). When audio data of 0.512 seconds is stored into either the first memory area 3a or the second memory area 3b, the system controller 5 transfers, to the disk recorder 2, the stored audio data at a high transfer rate (speed) of, e.g., 100 bps at the maximum.

It is to be noted that, also for this time period, audio data outputted from the codec 7 is being written, every 125μ seconds, into the other memory area.

At the time of recording audio data in this way, the system controller 5 controls the buffer memory 3 for recording so as to use the first memory area 3a and the second recording area 3b in a time divisional manner.

Audio data which has been intermittently read out at the rate (speed) of 10M bps from the first memory area 3a or the second memory area 3b of the buffer memory 3 for recording is delivered to the disk recorder 2. In this instance, the system controller 5 adds an absolute time code to the audio data. Thus, the disk recorder 2 records an absolute time of that audio data as well onto the hard disk or the magneto-optical disk together with the audio data.

Recording of this audio data is carried out until the recording stop key 34 shown in FIG. 2 is turned ON so that stop of recording is designated.

When the recording stop key 34 is turned ON and stop of recording is designated, the system controller 5 controls the disk recorder 2 so as to record, into the edit data recording area of the hard disk, a series of audio data which has been recorded as a single text with a text No. etc. indicating Nos. of address or text of the recording start point and the recording end point of the text being as TOC data.

Audio data of the text which is a series of audio data may be used as it is. However, if such audio data is divided into several data segments, it is easy to carry out retrieval of desired audio data. For this reason, the teacher carries out such an editing to divide the text into several segments to thereby form a plurality of sentences.

In order to divide the text into a plurality of sentences, the sentence division/fine adjustment key 26 shown in FIG. 2 is used.

The sentence division/fine adjustment key 26 is provided as a single key, for example. Within the key 26, however, three keys are provided. The central portion serves as a division key, the right side portion serves as an advance fine adjustment key for advancing the divisional point, e.g., by 64 m seconds and the left side portion serves as a reverse (withdrawal) fine adjustment key for reversing (withdrawing) the divisional point, e.g., by 64 m seconds.

The teacher carries out reproduction of audio data of the recorded text to allow the division key provided at the central portion of the sentence division/fine adjustment key 26 to be turned ON at a desired portion such as a portion between words pronounced. Thus, the system controller 5 controls the disk recorder 2 so as to divide the text into two segments at a portion where the division key is turned ON (the number of entire sentences is increased by one when viewed as a whole) to form two sentences, and to record addresses indicating recording start points and recording end points of two sentences, sentence Nos. of respective sentences, or the like into the edit data recording area.

It is to be noted that, in the case of attempting to carry out fine adjustment of the point where audio data within the text is divided into segments (divisional point), the advance fine adjustment key or the fine reverse (withdrawal) adjustment key is turned ON. Thus, the system controller 5 controls the disk recorder 2 so as to advance the divisional point, e.g., by 64 m seconds or reverse (withdraw) the divisional point, e.g., by 64 m seconds, and to record, into the edit data recording area, addresses showing new recording start points and new recording end points of respective sentences formed by carrying out fine adjustment of the divisional point or sentence Nos. of respective sentences, etc.

In the case of attempting to connect two sentences formed by carrying out the above-mentioned division, the sentence connection key 27 is turned ON in a stopped state at the final position of the present sentence. Thus, the system controller 5 controls the disk recorder 2 so as to connect the present sentence and the next sentence (the number of the entire sentences is reduced when viewed as a whole), and to newly record, into the edit data recording area, an address and a sentence No., etc. indicating the recording start point and the recording end point of the sentence formed by the connection.

When the text and the sentence are formed in this way, a text No., sentence No. and a recording address, etc. are recorded into the edit data recording area of the hard disk as described above.

Further, in the case of attempting to delete an unnecessary text, a text to be deleted is selected by the text reverse (withdrawal) key 30 or the text advance key 31. Namely, the system controller 5 controls the text No. display unit 20 so as to allow the text No. to be displayed to count down or count up every time the text reverse key 30 or the text advance key 31 is turned ON. The teacher selects the text to be deleted on the basis of the text No. displayed on the text No. display section 20 to allow the text delete key 23 to be turned ON. Thus, the system controller 5 controls the disk recorder 2 so as to delete audio data of the selected text, and to delete addresses indicating the recording start point and the recording end point of the deleted text which was recorded in the edit data recording area.

Further, in the case of attempting to delete an unnecessary sentence, a sentence to be deleted is selected by the sentence reverse (withdrawal) key 32 or the sentence advance key 33. Namely, the system controller 5 controls the sentence No./sentence end display section 21 so as to allow a sentence No. to be displayed to count down or count up every time the sentence reverse key 32 or the sentence advance key 33 is turned ON. The teacher selects the sentence to be deleted on the basis of a sentence No. displayed on the sentence No./sentence end display section 21, thus to allow the sentence delete key 24 to be turned ON. Thus, the system controller 5 controls the disk recorder 2 so as to delete audio data of the selected sentence, and to delete addresses indicating the recording s tart point and the recording end point of the deleted sentence which has been recorded in the edit data recording area.

It is to be noted that, in order to prevent a trouble by an erroneous operation, the system controller 5 is adapted to carry out a control as described above such that the selected text or sentence is not deleted until the text delete key 23 or the sentence delete key 24 continues to be turned on for one second.

While such an editing work may be manually carried out by using the sentence division/fine adjustment key 26 and the sentence connection key 27, etc., the voice recording/reproducing apparatus according to this embodiment is adapted to designate a voice responsive recording which will be described below to thereby carry out recording when voice is only inputted, and to automatically carry out division into the text and the sentence.

In order to designate the above-mentioned voice responsive recording, the text reverse key 30 or the text advance key 31 provided on the key panel 9 is turned ON to select a text where audio data is recorded while looking at a text No. displayed on the text No. display section 20, and to allow the reproduction key 35 and the automatic recording key 37 to be turned ON at the same time to carry out inputting of voice through the microphone 6.

The system controller 5 effects a control to write audio data formed at the codec 7 into the buffer memory 3 for recording every 125$\mu$ seconds as described above from the time point when the reproduction key 35 and the automatic recording key 37 are turned ON at the same time. At this time, the system controller 5 discriminates whether or not the amplitude of audio data of at least one sample of audio data of 128 samples (16 m sec) exceeds a value which is one tenth of the maximum value, and discriminates whether or not audio data of which amplitude is above a value which is one tenth of the maximum value continues, e.g., 13 times (16×13=208 m sec) or more. In the case where audio data of which amplitude exceeds a value which is one tenth of the maximum width is continued, e.g., 13 times or more, the system controller 5 judges that any voice is delivered. Thus, the system controller 5 controls the buffer memory 3 for recording so as to carry out readout from audio data before 512 m seconds retroactively from the time point when the above-mentioned judgment has been made of audio data written into the recording buffer memory 3. The audio data which has been read out from the buffer memory 3 for recording is delivered to the disk recorder 2 as described above, and is recorded onto the hard disk. At this time, the system controller 5 delivers, to the disk recorder 2, a recording start address of audio data recorded on the hard disk as recording start addresses of the text and the sentence. Thus, the recording start addresses of the text and the sentence are recorded into the edit data recording area of the hard disk.

When the system controller 5 initiates readout of the audio data from the buffer memory 3 for recording, it discriminates as to whether or not the amplitude of the audio data exceeds a value which is one tenth of the maximum value over successive 4096 samples (512 m seconds). In the case where the amplitude of the audio data does not exceed the value which is one tenth of the maximum value over successive 4096 samples, the system controller 5 judges that no voice is delivered to assume the time point retroactive by 320 m seconds from the time point when the above-mentioned judgment has been made to be a terminating point to deliver the recording end address of the sentence to the disk recorder 2. Thus, the recording end address of the sentence is recorded into the edit data recording area.

When recording of one sentence within a desired text is completed at the time of such voice responsive recording, the system controller 5 interrupts data transfer from the buffer memory 3 for recording to the disk recorder 2, and is thus placed in the state waiting for judgment of a subsequent voice input. When voice is inputted again, the system controller 5 controls the disk recorder 2 so as to start recording of subsequent audio data from the recording end address of the former sentence.

It is to be noted that when the system controller 5 detects that the stop key 34 is turned ON, the voice responsive recording is completed. In the completion of recording, the system controller 5 assumes the recording end point of the sentence last formed as a recording end address of the text to deliver the recording end address of this text to the disk recorder 2. Thus, the recording end address of the text is recorded into the edit data recording area of the hard disk.

In this way, such an editing is made to manually or automatically divide audio data recorded on the hard disk into texts and sentences. Thus, a master disk is formed. Meanwhile, there are instances where whether or not the master disk is precisely edited is examined. Particularly, the divisional point between sentences is delicate. Accordingly, setting of this divisional point becomes important in reproduction. The divisional point can be confirmed by allowing the sentence end reproduction key 25 provided on the key panel 9 to be turned ON.

Figure 3:
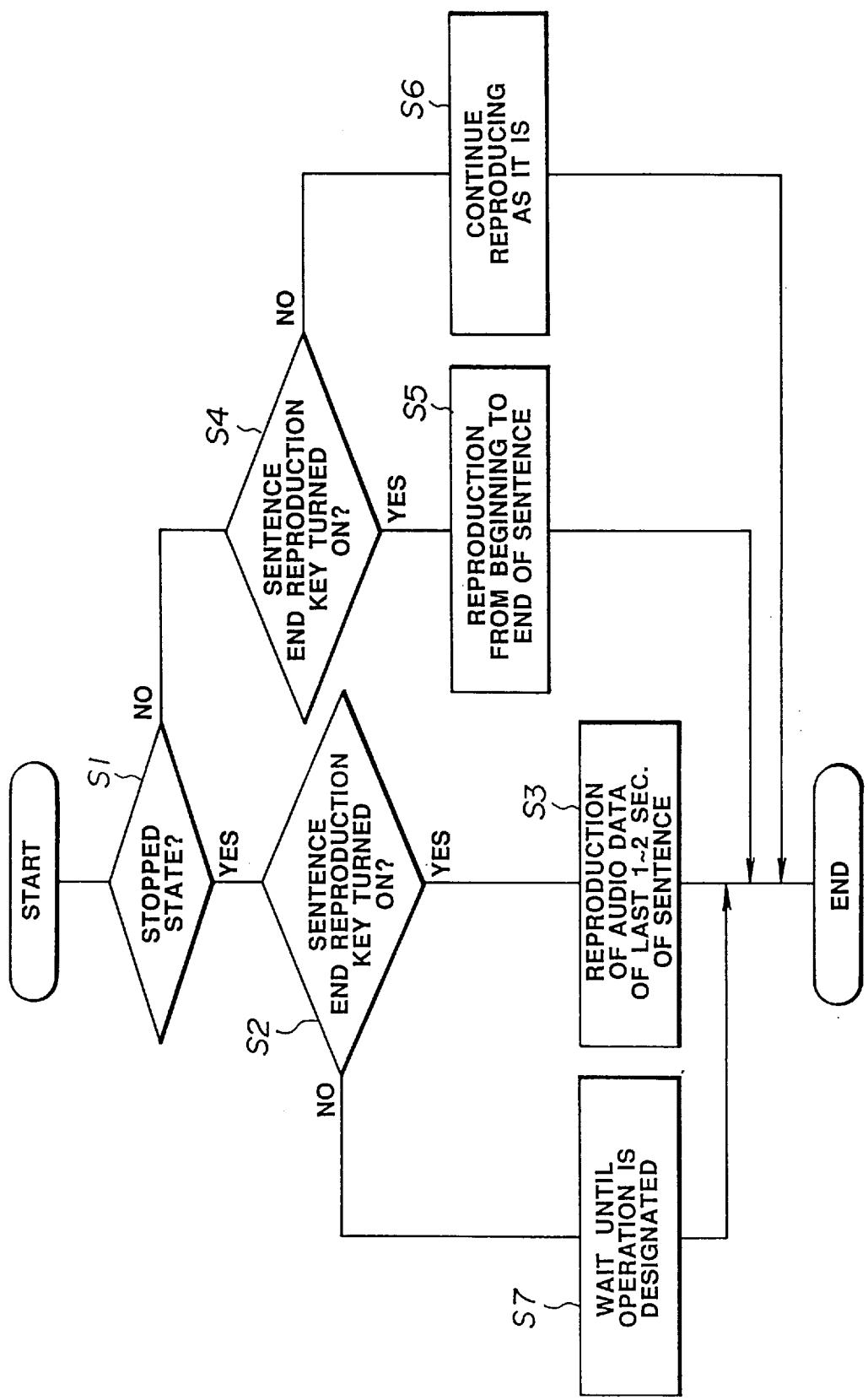
FIG. 3 is a flowchart for explaining a divisional point confirmation operation in the voice recording/reproducing apparatus shown in FIG. 1.

Namely, the operation of the voice recording/reproducing apparatus when the sentence end reproduction key 25 is turned ON is as shown in the flowchart of FIG. 3.

The flowchart shown in FIG. 3 starts when a sentence desired to confirm the divisional point is selected by the sentence reverse key 32 or the sentence advance key 33 after editing to divide audio data recorded on the hard disk into texts and sentences is completed. The processing proceeds to step S1.

At step S1, the system controller 5 discriminates whether or not the voice recording/reproducing apparatus is in a "stopped state" where no operation is designated. As a result, if the result of that discrimination is YES, the processing proceeds to step S2. In contrast, if the result of that discrimination is NO, the processing proceeds to step S4.

At the step S2, the system controller 5 discriminates whether or not the sentence end reproduction key 25 is turned ON in the stopped state. As a result, when the discrimination result is YES, the processing proceeds to step S3. In contrast, if the discrimination result is NO, the processing proceeds to step S7.

At the step S3, since the sentence end reproduction key 25 is turned ON in the stopped state, the system controller 5 controls the disk recorder 2 so as to reproduce audio data of the last predetermined time (e.g., 1~2 seconds) of audio data of the selected sentence to complete the processing.

At the step S7, since the sentence end reproduction key 25 is not turned ON in the stopped state, the voice recording/reproducing apparatus is maintained in the stopped state. Thus, the processing is completed.

On the other hand, at the step S4, the system controller 5 discriminates whether or not the sentence end reproduction key 25 is turned ON during reproduction. As a result, if the discrimination result is YES, the processing proceeds to step S5. In contrast, if the discrimination result is NO, the processing proceeds to step S6.

At the step S5, since the sentence end reproduction key 25 is turned ON during reproduction, the system controller 5 controls the disk recorder 2 so as to reproduce again, from the first, audio data of the sentence being reproduced at present to complete the processing.

Further, at the step S6, since the sentence end reproduction key 25 is not turned ON during reproduction, the system controller 5 controls the disk recorder 2 so as to continue reproduction as it is to complete the processing.

As stated above, in the voice recording/reproducing apparatus according to this embodiment, when division of the text and sentence of audio data recorded on the hard disk or the magneto-optical disk is completed to select a desired sentence thereafter to allow the sentence end reproduction key 25 to be turned ON in a stopped state, the system controller 5 controls the disk recorder 2 so as to reproduce audio data of the last predetermined time of audio data of the selected sentence. For this reason, it is possible to quickly and easily confirm the divisional point between sentences, thus to carry out a precise editing of the master disk in a short time.

When the master disk is completed by the teacher in this way, learning by the student can be conducted. The student carries out reproduction of audio data recorded on the master disk (hard disk or magneto-optical disk) to carry out exercise of pronunciation, etc.

Namely, in the case where the student is desirous to carry out reproduction from the first sentence of the first text of texts and the sentences recorded on the hard disk or the magneto-optical disk, he allows the reproduction key 35 to be turned ON. As described above, TOC data such as recording start addresses and recording end addresses, etc. of audio data recorded on the master disk are recorded in the edit data recording area. For this reason, the system controller 5 reproduces the TOC data recorded in advance in the edit data recording area before reproduction is designated to recognize the recording position of audio data of respective texts and respective sentences. When the reproduction key 35 is turned ON, the system controller 5 controls the disk recorder 2 so as to start reproduction from audio data of the sentence No. 1 in data of the text No. 1 of audio data recorded on the hard disk or the magneto-optical disk.

It is to be noted that an absolute time code indicating an absolute time of audio data of words that the teacher has pronounced is included in addition to that audio data in the audio data to be reproduced.

The system controller 5 controls the first memory area 4a and the second memory area 4b so as to transfer, at a high speed, audio data which has been read from the hard disk or the magneto-optical disk to the first memory area 4a or the second memory area 4b and write it thereinto with a time of 0.512 seconds (4096 bytes) corresponding to the memory capacity of the first memory area 4a or the second memory area 4b being as a unit. At the same time, the system controller 5 delivers a timing signal of 8 KHz as an interruption request signal to the first memory area 4a or the second memory area 4b. Thus, audio data written into the first memory area 4a or the second memory area 4b are sequentially read out every $125\mu$ sec. as audio data of 8 bits, for example, and is delivered to the codec 7 through the bus line 10.

The system controller 5 controls the disk recorder 2 so that when any one of the respective memory areas 4a and 4b is in an empty state, it reads out the subsequent data from the hard disk or the magneto-optical disk. It is to be noted that audio data continues to be transferred from the other memory area to the codec 7 every $125\mu$ seconds also for this time period.

The system controller 5 controls, at the time of reproduction of audio data, the buffer memory 4 for reproduction so as to use, in a time divisional manner, the first memory area 4a and the second memory area 4b as stated above.

The codec 7 applies D/A conversion to the audio data delivered from the respective memory areas 4a, 4b to form an audio signal as an analog signal to deliver it to the speaker unit 8. Thus, voice, etc. of the teacher is produced from the speaker unit 8. The student carries out exercise of pronunciation in accordance with voice of the teacher produced from the speaker unit 8.

It is to be noted that the system controller 5 reproduces, from the TOC data, data indicating the text Nos. and the sentence Nos. of audio data being reproduced to deliver each of those data to the codec 7. The codec 7 delivers the data indicating the text Nos. and the sentence Nos. to the text No. display section 20 and the sentence No./sentence end display section 21, respectively. Thus, the text No. and the sentence No. of the audio data being reproduced are displayed on the text No. display section 20 and the sentence No./sentence end display section 21, respectively.

An absolute time code of audio data reproduced therewith is delivered to the counter 22 through the codec 7. Thus, an absolute time code (elapsed time in reproduction) of audio data being reproduced at present is displayed at the counter 22.

Such reproduction of audio data is continued until the system controller 5 detects that the stop key 34 shown in FIG. 2 is turned ON, or that reproduction of entire audio data recorded on the hard disk or the magneto-optical disk is completed.

While explanation has been given in connection with the case where an attempt is made to carry out reproduction from the first sentence of the first text, so called a retrieval to designate a desired text or sentence to carry out reproduction thereof may be conducted in the case of carrying out reproduction of that desired text or sentence.

Namely, when the student allows the text reverse key 30 and the text advance key 31 to be turned ON, the system controller 5 detects this ON operation to control the text No. display section 20 so as to allow a text No. displayed to count down or count up one by one every time the respective keys 30, 31 are turned ON. Further, when the student allows the sentence reverse key 32 and the sentence advance key 33 to be turned ON, the system controller 5 detects this ON operation to control the sentence No./sentence end display section 21 so as to allow a sentence No. displayed to count down or count up one by one every time the respective keys 32, 33 are turned ON.

The student selects a desired text or sentence on the basis of a text No. and a sentence No. displayed on the text No. display section 20 and the sentence No./sentence end display section 21. After the student carries out selection of the desired text or sentence, he allows the reproduction key 35 to be turned ON. When the reproduction key 35 is turned ON, the system controller 5 controls the disk recorder 2 so as to carry out reproduction of audio data of the selected text or sentence. Thus, audio data of the selected text or sentence is reproduced. As a result, voice is produced from the speaker unit 8.

As described above, the system controller 5 reproduces in advance TOC data recorded in the edit data recording area to thereby recognize recording start addresses and recording end addresses of respective texts and respective sentences. For this reason, the system controller 5 can promptly carry out reproduction of audio data of a designated text or sentence.

Accordingly, the voice recording/reproducing apparatus according to this embodiment can simply and rapidly retrieve of audio data of a desired text or sentence.

In the case of attempting to carry out a finer retrieval, the student selects and reproduces a desired text and a desired sentence as described above to allow the quick reverse key 28 or the quick advance key 29 to be turned ON during reproduction. When the system controller 5 detects that the quick reverse key 28 or the quick advance key 29 is turned ON during reproduction, it controls the disk recorder 2 so as to carry out skip-reproduction, e.g., every 2~3 seconds only for a time period during which respective keys 28, 29 are turned ON, and controls the counter 22 so as to allow the absolute time code to be put forward or backward in time at a high speed every 2~3 seconds.

For this reason, it is possible to rapidly and readily carry out retrieval of fine audio data, e.g., a desired portion, etc. within a sentence.

It is to be noted while actual numeric values were used in order to giver more detailed explanation in the description of the above-described embodiment such that, e.g., the codec 7 applies A/D conversion to an audio signal delivered every $125\mu$ sec., and first and second memory areas 4a, 4b respectively having times of 0.512 seconds, are provided in the buffer memory 4 for recording, or the like, it is a matter of course that this invention may employ arbitrary values without being limited to the above-described numeric values in the least.

The voice recording/reproducing apparatus according to this invention is a voice recording/reproducing apparatus adapted to deliver audio data from the operation unit for operating recording/reproduction of audio data to the disk recorder through the memory means to record it onto the disk, and to deliver audio data reproduced from the disk by the disk recorder to the operation unit through the memory means to carry out pronunciation, wherein editing means is used, thus making it possible to divide audio data recorded on the disk into texts of audio data in the reproduction area of one unit and sentences of audio data in a plurality of partial reproduction areas obtained by dividing audio data of the text into a plurality of data segments, whereby the control means controls the disk recorder so as to record, onto the disk, recording start data and recording end data of audio data of the text and the sentence.

For this reason, in carrying out reproduction of desired audio data, by designating a recording address of the text or the sentence, the control means can quickly reproduce audio data of a designated recording address, and can carry out retrieval of the desired audio data with ease and in a short time.

The voice recording/reproducing apparatus according to this invention is adapted so that When the sentence end reproduction key provided at the operation unit is turned ON, the control means reproduces audio data of the last predetermined time of audio data of that sentence.

For this reason, it is possible to easily and quickly confirm whether or not the divisional point between sentences is suitable.

Further, since it is possible to simply and quickly confirm whether or not the divisional point between sentences is appropriate, it is possible to edit again the divisional point so that its position is correct, thus making it possible to a precise master disk in a short time.

Meanwhile, there are instances where words are difficult to hear because the teacher pronounces them too fast, e.g., in carrying out exercise of pronunciation. To cope with such circumstances, in the voice recording/reproducing apparatus of this embodiment, a variable speed reproduction key 40 is provided on a key panel 9. Thus, the system controller 5 adjustably controls a reproduction speed so that it is equal to, e.g., the standard speed, a speed of three fourth of the standard speed (¾ speed), and a speed of one half of the standard speed (½ speed) every time the variable speed reproduction key 40 is turned ON.

Namely, when the above-mentioned reproduction is started, reproduced audio data is stored into the buffer memory 4 for reproduction. The audio data, stored in the buffer memory 4 are sequentially read out and words corresponding thereto are pronounced every $125\mu$ seconds. When the variable speed reproduction key 40 is turned ON during reproduction, the system controller 5 controls the buffer memory 4 for reproduction so as to read out audio data repeating two by two m units per n units with, e.g., 32 m seconds being as one unit. Thus, low speed reproduction where the musical interval (pitch) is invariant can be carried out at a speed of $n/(n+m)$.

Figures 4A, 4B:
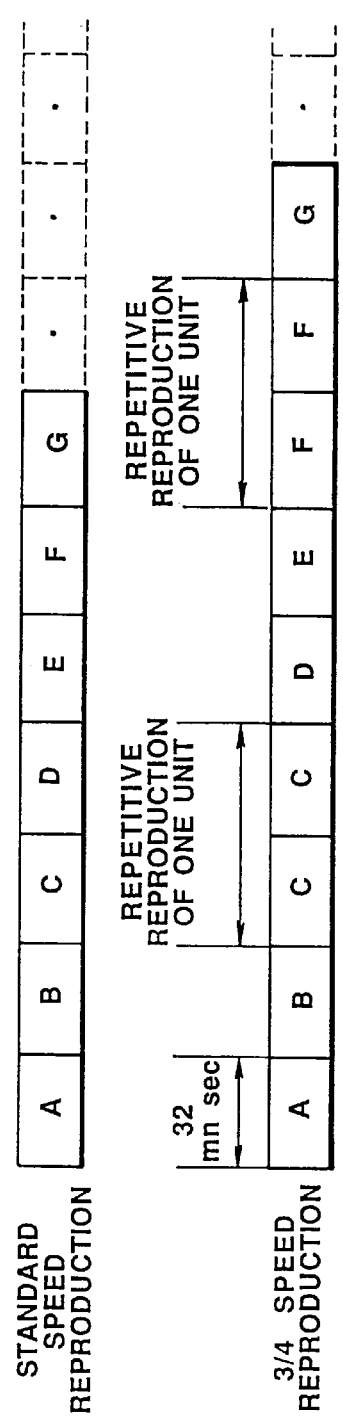
FIGS. 4A and 4B are schematic diagrams for explaining a variable speed reproducing operation in the voice recording/reproducing apparatus shown in FIG. 1, respectively.

In actual terms, when the variable speed reproduction key 40 is turned ON once during the reproduction, the system controller 5 controls the buffer memory 4 so as to read out audio data which have been read out in order of A, B, C, D, E, F, G . . . as shown in FIG. 4A until that time in a manner to repeat twice audio data of the third unit like A, B, C, C, D, E, F, F, G . . . with 32 m seconds being as one unit as shown in FIG. 4B. Thus, it is possible to output, from the speaker unit 8, a voice where a reproduction speed is three fourth of the standard speed, but the pitch is not changed. For this reason, the student can hear fine pronunciation of words and make pronunciation of words close to pronunciation of words of the teacher.

It is to be noted that an approach is employed to control the buffer memory 4 for reproduction so as to read out audio data stored in the buffer memory 4 for reproduction with data of the m units per n units being omitted, thus making it possible to carry out high speed reproduction of the unchanged pitch at a reproducing speed (rate) of $n/(n-m)$. While the voice recording/reproducing apparatus is constructed so that the variable speed reproduction key 40 is turned ON to thereby make it possible to carry out only a low speed reproduction of the unchanged pitch, this apparatus may be provided with a high speed reproducing function of the unchanged pitch as described above.

Meanwhile, there are various learning methods for learning of foreign languages. For this reason, in this voice recording/reproducing apparatus, six learning methods of the mode Nos. 0~5 are programmed as the software to operate the system controller 5 in order to permit the student to select a desired learning method in conformity with himself. Any one of the respective modes may be selected by a mode selection key 38 shown in FIG. 2. Namely, the system controller 5 controls the mode display section 39 so as to allow a mode No. displayed on the mode display section 39 to count up one by one from zero (0) every time the mode selection key 38 is turned ON to cause it to count up to 6 thereafter to allow it to count down to zero (0) for a second time to allow it to count up again.

In actual terms, the mode indicated by the mode No. 0 is a mode permitting only ordinary reproduction of audio data of the text and the sentence. When the mode of this number is selected, the system controller 5 controls the disk recorder 2 so as to reproduce audio data of a selected sentence as described above.

The mode indicated by the mode No. 1 is a mode used mainly for exercise of pronunciation. When this mode is selected, the system controller 5 first controls the disk recorder 2 so as to reproduce audio data of the present sentence. Thus, pronunciation of words corresponding to audio data of the sentence is produced from the speaker unit 8. Then, the system controller 5 controls the audio signal selection circuit 12 so that voice input from the head set 11 is obtained. The voice produced from the speaker unit 8 is a word that, e.g., the teacher has pronounced. The student pronounces that word by himself following pronunciation of the teacher. The voice of the student is collected by the head set 11, and is delivered to the codec 7 through the audio signal selection circuit 12 as an audio signal. The audio signal which has been delivered to the codec 7 is converted to audio data which is digital data as described above, and is delivered to the disk recorder 2 through the buffer memory 3 for recording. The system controller 5 controls the disk recorder 2 so as to record this audio data into the student recording area of the hard disk or the magneto-optical disk. Then, the system controller 5 controls the disk recorder 2 so as to reproduce audio data of the sentence next to the present sentence. Further, the system controller 5 controls the audio signal selection circuit 12 so that an input of an audio signal from the head set 11 is obtained, thus to control the disk recorder 2 so as to record a voice made by the student.

In this way, when the mode indicated by the mode No. 1 is selected, the system controller 5 carries out a control as described above so as to alternately carry out reproduction of audio data of the sentence recorded by the teacher and recording of voice made by the student.

Thus, the student can reproduce the recorded his voice and listen to it again after a series of pronunciation practice is completed. As a result, the student can recognize drawbacks, etc. of his pronunciation.

The mode indicated by the mode No. 2 is a mode mainly used for pronunciation practice similarly to the mode indicated by the mode No. 1. When this mode is selected, the system controller 5 first controls the disk recorder 2 so as to reproduce audio data of the present sentence. Thus, voice corresponding to the audio data of the sentence is produced from the speaker unit 8. Then, the system controller 5 controls the audio signal selection circuit 12 so that a voice input from the head set 11 is obtained. In this instance, the voice produced from the speaker unit 8 is a word that, e.g., the teacher has pronounced. The student carries out pronunciation of that word by himself following pronunciation of the teacher. The voice of the student collected by the head set 11 is delivered to the disk recorder 2 as described above. The system controller 5 controls the disk recorder 2 so as to record the voice of this student into the student recording area. Then, the system controller 5 controls the disk recorder 2 so as to reproduce the voice of the student previously recorded in the student recording area. Thus, the voice of words that the student has already pronounced by himself is produced from the speaker unit 8. Then, the system controller 5 controls the disk recorder 2 so as to reproduce audio data of the sentence subsequent to the present sentence. In addition, after the system controller 5 carries out reproduction of audio data of the next sentence, it controls the disk recorder 2 so as to record and reproduce the voice of the student.

In this way, the system controller 5 carries out a control as described above such that when the mode indicated by the mode No. 2 is selected, such an operation to reproduce audio data of the sentence recorded by the teacher thereafter to record and reproduce voice of words pronounced by the student is repeatedly carried out.

Thus, the student can immediately confirm pronunciation that he has made by himself and more efficiently carry out pronunciation practice.

The mode indicated by the mode No. 3 is a mode mainly used for exercise of conversation. On the hard disk or the magneto-electro disk, e.g., a series of conversations by two teaches are recorded for the mode No. 3. Each of compositions constituting these conversations is divided into sentences. When this mode is selected, the system controller 5 first controls the disk recorder 2 so as to reproduce audio data of the present sentence. Thus, a voice of words that one teacher has pronounced is produced from the speaker unit 8. Then, the system controller 5 controls the audio signal selection circuit 12 so that a voice input from the head set 11 is obtained. The student responds to the word of one teacher, i.e., pronounces the same word as the word that the other teacher has pronounced. The system controller 5 controls the disk recorder 2 so as to record the voice of the student collected by the head set 11 into the student recording area of the hard disk as described above. Then, the system controller 5 controls the disk recorder 2 so as to reproduce the next sentence skipped by one sentence. Thus, voice of one teacher responding to the word of the student is produced from the speaker unit 8. Then, the system controller 5 controls the disk recorder 2 so as to record the word of the student responding to the word of one teacher into the student recording area.

Namely, the system controller 5 controls the disk recorder 2 so that when the mode indicated by the mode No. 3 is selected, it reproduces only the word pronounced by one teacher of words of a conversation by two teachers recorded on the hard disk, and records the same word as that of the other teacher pronounced by the student.

Thus, the student can carry out exercise of conversation supposing the student himself as the other teacher.

In this case, since the system controller 5 controls the disk recorder 2 so as to reproduce the present sentence thereafter to reproduce the next sentence skipped by one sentence, in the case where voice of one teacher is recorded as the present sentence, reproduction of only voice by one teacher is carried out. However, the sentence reverse key 32 or the sentence advance key 33 is used to allow the present sentence to be the sentence where voice of the other teacher is recorded, thereby making it possible to reproduce only voice of the other teacher. Thus, the student can carry out exercise of conversation supposing the student himself as one teacher.

The mode indicated by the mode No. 4 is a mode mainly used for exercise of pronunciation similarly to the modes indicated by the mode No. 1 and the mode No. 2. When this mode is selected, the system controller 5 first controls the disk recorder 2 so as to reproduce audio data of the present sentence. Thus, e.g., voice of a word pronounced by the teacher is produced from the speaker unit 8. The student pronounces that word by himself following pronunciation of the teacher. At this time, the system controller 5 controls the audio signal selection circuit 12 so that a voice input from the head set 11 is obtained. Thus, voice of the student is collected by the head set 11, and is delivered to the disk recorder 2 as described above. The system controller 5 controls the disk recorder 2 so as to record voice of this student into the student recording area. Then, the system controller 5 controls the disk recorder 2 so as to reproduce voice of the student previously recorded in the student recording area. Thus, voice of words that the student has already pronounced by himself is produced from the speaker unit 8. Then, the system controller 5 controls the disk recorder 2 so as to reproduce again audio data of the present sentence. In addition, the system controller 5 controls the disk recorder 2 so as to reproduce audio data of the present sentence thereafter to record again voice of the student to reproduce it.

When the mode indicated by the mode No. 4 is selected in this way, the system controller 5 carries out a control as described above so as to reproduce audio data of the sentence recorded by the teacher to record and reproduce voice of words pronounced by the student to reproduce audio data of the same sentence for a second time.

Thus, the student can carry out exercise of pronunciation of the same word until he is convinced.

The mode designated by the mode No. 5 is a mode mainly used for exercise of pronunciation similarly to the modes designated by the mode No. 1, the mode No. 2, and the mode No. 4. Namely, in the case where the student is difficult to understand pronunciation of words pronounced by the student itself, this mode is selected. When this mode is selected, the system controller 5 first controls the audio signal selection circuit 12 so that a voice input from the head set 11 is obtained. The student pronounces a desired word, etc. by using the head set 11. The voice of the word pronounced by the student is collected by the head set 11, and is delivered to the disk recorder 2 as described above. The system controller 5 controls the disk recorder 2 so as to record the voice of the word pronounced by the student into the student recording area of the hard disk or the magneto-optical disk. Then, the system controller 5 controls the disk recorder 2 so as to reproduce voice of the student already recorded into the student recording area. Thus, voice of words that the student himself has already pronounced is produced from the speaker unit 8. The system controller 5 then controls the audio signal selection circuit 12 so that a voice input from the head set 11 is obtained for a second time to record voice of words pronounced by the student into the student recording area, and controls the disk recorder 2 so as to reproduce the recorded voice by the student.

When the mode indicated by the mode No. 5 is selected in this way, the system controller 5 controls the disk recorder 2 so as to repeat recording and reproduction of the voice of words pronounced by the student.

Thus, the student can confirm pronunciation of the student himself, and recognize drawbacks of pronunciation of the student himself.

It is to be noted that the above-described voice response recording is selected in executing respective modes indicated by the mode Nos. 0~5, thereby making it possible to carry out only voiced sound recording without carrying out silent recording into the student recording area of the hard disk or the magneto-optical disk.

As is clear from the foregoing description, the voice recording/reproducing apparatus according to this embodiment is provided with a plurality of learning modes (mode Nos. 0~5). The student is permitted to freely select a desired mode, thereby making it possible to carry out learning suitable for individual person.

For this reason, the learning effect can be enhanced.

It is to be noted that, in the description of the above-described embodiment, actual numeric values are used for giving more detailed explanation such that, e.g., the codec 7 applies A/D conversion to an audio signal delivered thereto every 125$\mu$ sec, and first and second memory areas 3a, 3b of 0.512 seconds are provided in the recording buffer memory 3, or the like. However, it is of course that the present invention may take an arbitrary value without being limited to the above-described numeric values in the least.

The voice recording/reproducing apparatus according to this invention is a voice recording/reproducing apparatus adapted for delivering audio data from the operation unit for operating recording/reproduction of audio data to the disk recorder through memory means to record it onto the disk, or to deliver audio data reproduced from the disk to the operation unit through the memory means by the disk recorder to produce a corresponding voice, whereby when the recording/reproducing mode selection means selects a desired recording/reproducing mode among a plurality of recording/reproducing modes formed so that the execution order of reproduction of audio data of sentences formed by dividing the audio data of text recorded as audio data in the reproducing area of one unit on the disk into a plurality of partial reproduction areas, recording of audio data by user, and reproduction of audio data recorded by user are caused to be different, the control means controls the disk recorder so as to carry out recording/reproduction in dependency upon the selected recording/reproducing mode. For this reason, the student can execute a recording/reproducing mode suitable for the student himself.

Accordingly, in the case where exercise of pronunciation is carried out by the voice recording/reproducing apparatus according to this invention, the student can carry out learning suitable for the student himself, thus to enhance the learning effect.

Meanwhile, there are instances where there is a need to carry out a more rough retrieval in place of allowing the quick reverse key 28 or the quick advance key 29 to be turned ON to carry out a skip-reproduction every 2~3 seconds to conduct a fine retrieval of audio data within the sentence.

In the voice recording/reproducing apparatus, the stop key 34, the quick reverse key 28, and the quick advance key 29 constitutes a skip key 41. When the quick reverse key 28 or the quick advance key 29 is turned ON while allowing the stop key 34 to be turned ON, the system controller 5 detects this ON operation to control the disk recorder 2 so as to reverse (withdraw) or advance, at a predetermined interval, the reproducing position of audio data recorded on the hard disk every time the quick reverse key 28 or the quick advance key 29 is turned ON, thereby making it possible to carry out a rough retrieval.

Figure 5:
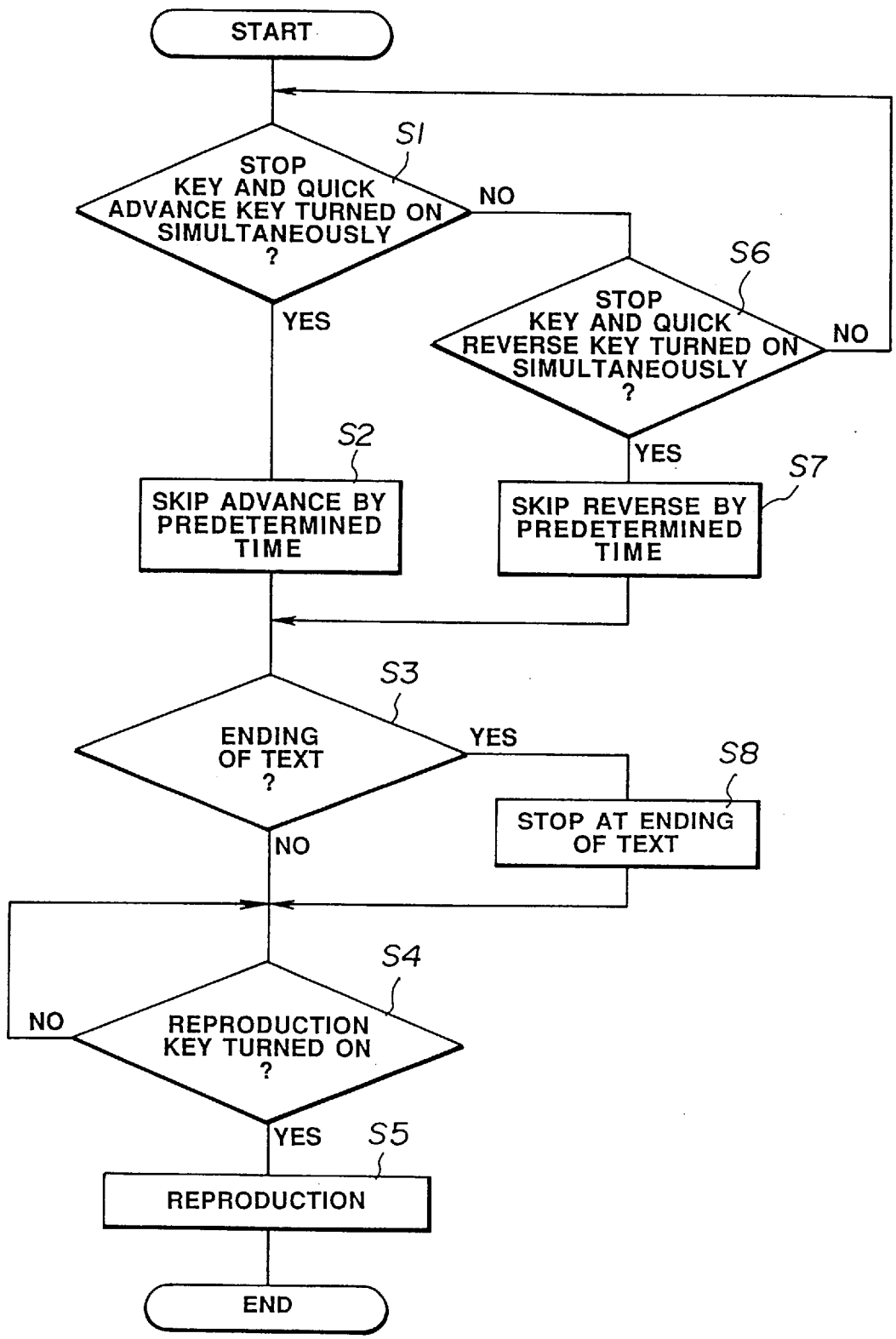
FIG. 5 is a flowchart for explaining a retrieval operation in a short time in the voice recording/reproducing apparatus shown in FIG. 1.

The operation of the voice recording/reproducing apparatus when such a rough retrieval is carried out is shown in the flowchart of FIG. 5.

The flowchart shown in FIG. 5 starts when audio data is recorded on the hard disk or the magneto-optical disk. Thus, the processing proceeds to step S1.

At the step S1, the system controller 5 discriminates as to whether or not the quick advance key 29 is turned ON under the condition where the stop key 34 is turned ON. As a result, if the discrimination result is YES, the processing proceeds to step S2. In contrast, if the discrimination result is NO, the processing proceeds to step S6.

At the step S6, the system controller 5 discriminates as to whether or not the quick reverse key 28 is turned ON under the state where the stop key 34 is turned ON. As a result, if the discrimination result is YES, the processing proceeds to step S7. In contrast, if the discrimination result is NO, the processing returns to the step S1 to repeat the routine of the step S1 and the step S6.

The step S7 corresponds to the case where the quick reverse key 28 is turned ON under the state where the stop key 34 is turned ON. Accordingly, the system controller 5 detects this ON operation to control the counter 22 so as to carry out such a skip reverse operation to put the absolute time code back, e.g., by five minutes every time the quick reverse key 28 is turned ON once under the state where the stop key 34 is turned ON to proceed to step S3.

The above-mentioned step S2 corresponds to the case where the quick advance key 29 is turned ON under the state where the stop key 34 is turned ON. Accordingly, the system controller 5 detects this ON operation to control the counter 22 so as to carry out skip advance to put the absolute time code forward, e.g., by five minutes every time the quick advance key 29 is turned ON once under the state where the stop key 34 is turned ON to proceed to the step S3.

At the step S3, the system controller 5 discriminates as to whether or not a corresponding portion exceeds the recording leading portion or the recording end portion (hereinafter referred to as an ending) of that text when the skip advance or skip reverse is carried out. As a result, if the discrimination result is YES, the processing proceeds to step S8. In contrast, if the discrimination result is No, the processing proceeds to step S4.

At the step S8, since the corresponding portion exceed the ending of that text as the result of execution of the skip advance or the skip reverse, the system controller 5 controls the counter 22 so as to display, e.g., an absolute time code of the ending of that text (absolute time code of audio data of the beginning of that text, or absolute time code of audio data of the ending of that text) to proceed to step S4.

At the step S4, the system controller 5 discriminates as to whether or not the reproduction key 35 is turned ON. As a result, if the discrimination results is YES, the processing proceeds to step S5. In contrast, if the discrimination result is NO, the step S4 is repeated until it is discriminated that the reproducing key 35 is turned ON.

At the step S5, the system controller 5 controls the disk recorder 2 so as to reproduce audio data selected by the skip advance or the skip reverse to complete the processing.

Since the skip advance and skip reverse functions enable skip-designation, e.g., at an interval of five minutes, audio data reproduced as described above, it is possible to carry out retrieval more rough than a fine retrieval by the above-mentioned skip-reproduction every 2~3 seconds.

For this reason, in retrieving desired audio data from audio data extending over a long time,.rough retrieval is first carried out by the skip advance or the skip reverse to carry out a fine retrieval by a skip-reproduction every 2~3 seconds, thereby making it possible to carry out retrieval of desired audio data more quickly. Since an employment of such an approach can quickly retrieve desired audio data not only when the student retrieves desired audio data from a master disk prepared in advance by the teacher, but also when the teacher prepares a master disk, the master disk can be prepared quickly.

Since the skip advance and the skip reverse can be executed by allowing the quick reverse key 28 or the quick advance 29 to be turned ON while allowing the stop key 34 to be turned ON, there is no necessity of providing a special key dedicated thereto. Thus, the size of the key panel can be reduced.

While it has been described that the skip key 41 is comprised of the stop key 34, the quick reverse key 28, and the quick advance key 29, such skip key 41 may be provided separately from the stop key 34, the quick reverse key 28, and the quick advance key 29.

It is to be noted while the reproducing position is moved at a time interval of five minutes in the skip advance or the skip reverse, such a time interval may be arbitrary.

Further, while it has been described that, in the skip advance or the skip reverse, the reproducing position is moved at the interval of five minutes to carry out reproduction from the moved position when the reproduction key 35 is turned ON for a second time, reproduction may be automatically carried out from the moved position before the reproduction key 35 is turned ON for a second time.

While, in the description of the above-described embodiment, actual numeric values are used for providing more detailed description such that, e.g., the codec 7 applies A/D conversion to an audio signal delivered thereto every $125\mu$ seconds, and first and second memory areas 4$a$, 4$b$ of 0.512 seconds are provided in the buffer memory 4 for recording, or the like, it is needless to say that this invention may take an arbitrary value without being limited to the above-described numeric values in the least.

The voice recording/reproducing apparatus according to this invention is directed to an audio recording/reproducing apparatus adapted to deliver audio data from an operation unit for operating recording/reproduction of audio data to the disk recorder through the memory means to record it onto the disk, or to deliver audio data reproduced from the disk by the disk recorder to the operation unit through the memory means to produce corresponding voice, wherein every time the skip key provided on the operation unit is turned ON, the control means controls the disk recorder so as to move the reproducing position of audio data recorded on the disk at a predetermined interval, thereby making it possible to move the reproducing position at a high speed.

For this reason, retrieval of desired audio data can be carried out in a short time.

Further, in the case where the sentence division/fine adjustment key 26 and the automatic recording key 37 are turned ON at the same time, the system controller 5 detects this ON operation to control the disk recorder 2 so as to reproduce audio data of text recorded on the hard disk or the magneto-optical disk. The system controller 5 retrieves a silent portion of a predetermined time or more in the reproduced audio data of the text. As a result, when the silent portion is detected as the result of retrieval, the position before a predetermined time from the leading position of audio data recorded after the silent portion is assumed as a divisional point. Thus, the system controller 5 controls the disk recorder 2 so as to record, onto the hard disk or the magneto-optical disk, recording start addresses and recording end addresses of audio data of sentences recorded before the divisional point and recording start addresses and recording end addresses of audio data of sentences after the divisional point, thereby to automatically divide audio data of the text into audio data of a plurality of sentences.

Figure 6:
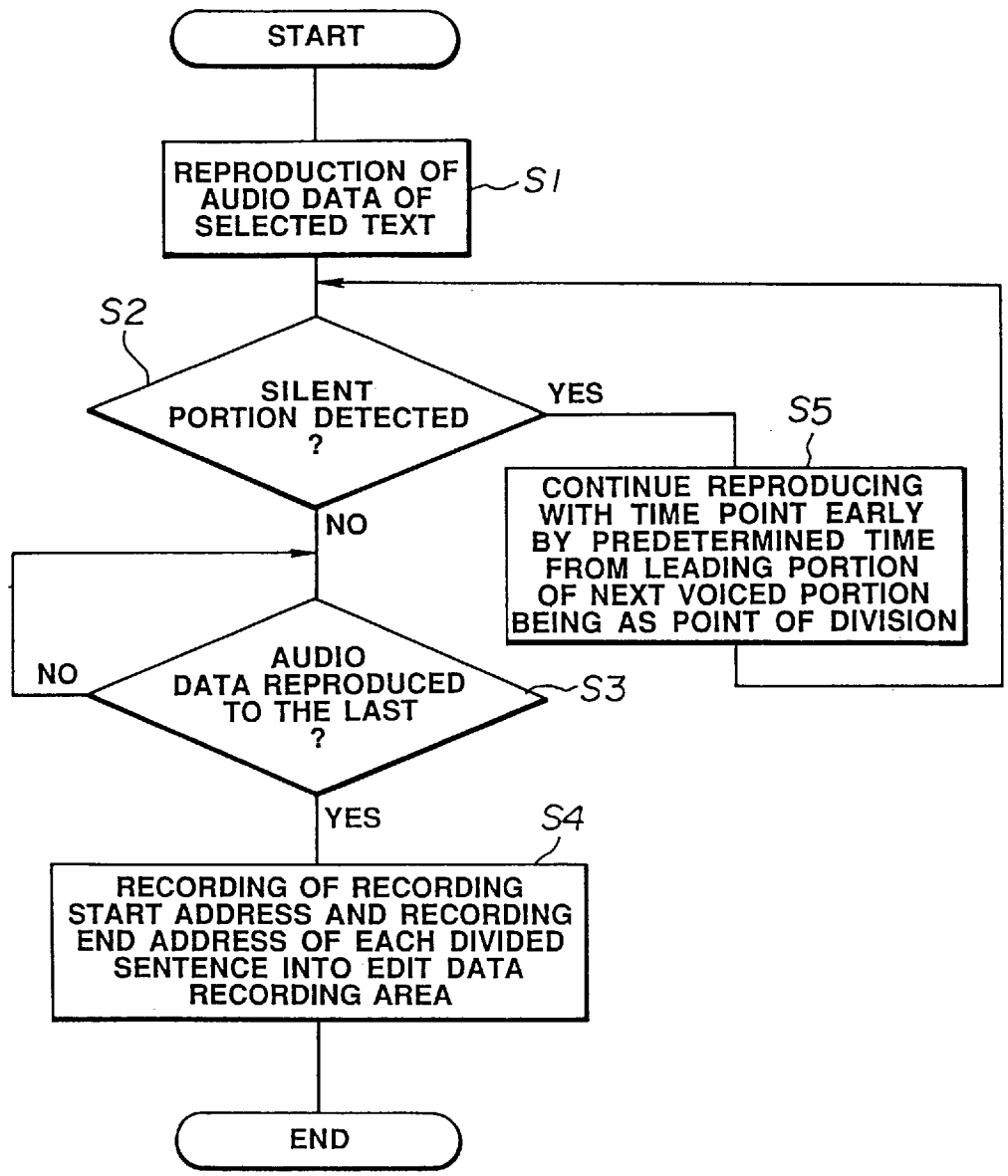
FIG. 6 is a flowchart for explaining an automatic divisional operation of a sentence in the voice recording/reproducing apparatus shown in FIG. 1.

The operation of the voice recording/reproducing apparatus according to this embodiment at the time of the sentence automatic division is shown in the flowchart of FIG. 6.

The processing of the flowchart shown in FIG. 6 starts when a text for carrying out an automatic division into sentences is selected by the text reverse key 30 or the text advance key 31 after recording of the audio data is completed, and the sentence division/fine adjustment key 26 and the automatic recording key 37 are turned ON at the same time in a stopped state where no operation is designated to proceed to step S1.

At the step S1, the system controller 5 reproduces, at a high speed, audio data of the selected text to proceed to step S2.

At the step S2, the system controller 5 detects whether or not there is silent audio data of a predetermined time or more in audio data reproduced at a high speed. As a result, if the detection result is NO, the processing proceeds to step S3. In contrast, if the detection result is YES, the processing proceeds to step S5.

Namely, the system controller 5 effects a control so as to write audio data reproduced from the hard disk or the magneto-optical disk into the buffer memory 4 for reproduction as described above. At this time, the system controller 5 discriminates as to whether or not the amplitude of audio data of at least one sample of audio data of 128 samples (16 m sec.) is above a value of one tenth of the maximum amplitude, and discriminates as to whether or not audio data each of which amplitude is above one tenth of the maximum amplitude are successive, e.g., thirteen times (16×13=208 m sec., or more. As a result, in the case where audio data each of which amplitude is above one tenth of the maximum amplitude are not successive, e.g., 13 times or more, the concerned portion is judged as a silent portion. Thus, the processing proceeds the step S5.

On the contrary, in the case where audio data each of which amplitude is above one tenth of the maximum amplitude are successive thirteen times or more, the concerned portion is judged as a voiced sound portion. Thus, the processing proceeds to the step S3.

At the step S5, since the concerned portion is judged as a silent portion at the step S2, the system controller 5 assumes the time point earlier, e.g., by a predetermined time (e.g., 512 m sec.) from the leading portion of audio data of this voiced sound portion to be a divisional point between sentences, and stores recording start addresses and recording end addresses of sentences before the divisional point and recording start addresses and recording end addresses of sentences after the divisional point, thus to return to the step S2. The execution of the routine of the step S2 and the step S5 is continued until the system controller 5 does not detect a silent portion at the step S2. Accordingly, the audio data of text is divided into sentences at the portion where a silent portion of a predetermined time or more is present. Since a silent portion of a predetermined time or more corresponds to the portion between words pronounced by the teacher, for example. Accordingly, even if division is carried out at the portion having a silent portion of a predetermined time or more, there is no problem.

On the other hand, at the step S3, since no silent portion is detected, the system controller 5 discriminates as to whether or not audio data of the selected text is reproduced to the last.

As a result, if the discrimination result is YES, the processing proceeds to step S4. In contrast, if the discrimination result is NO, the step S3 is repeated until it is judged that audio data of the selected text is reproduced to the last at the step S3.

At the step S4, the system controller 5 controls the disk recorder 2 so as to record recording start addresses and recording end addresses of respective sentences formed and stored by carrying out the above-described division into the edit data recording area of the hard disk.

In this way, in the voice recording/reproducing apparatus according to this embodiment, when the sentence division/fine adjustment key 26 and the automatic recording key 37 are turned ON at the same time, the system controller 5 detects a silent portion in the audio data of text to control the disk recorder 2 so as to automatically divide the audio data into sentences with the silent portion being as the boundary. For this reason, a troublesome work to manually divide audio data of text into a plurality of sentences can be saved.

The voice recording/reproducing apparatus according to this invention is a voice recording/reproducing apparatus adapted to deliver audio data from the operation unit for operating recording/reproduction of audio data to the disk recorder through the memory means to record it onto the disk, and to deliver audio data reproduced from the disk by the disk recorder to the operation unit through the memory means to produce a corresponding voice. This apparatus has a configuration such that in the case where an automatic division of the audio data is designated by the audio data automatic division designation means for automatically dividing audio data recorded on the disk, the control means controls the disk recorder so as to reproduce audio data recorded on the disk to retrieve a silent portion of a predetermined time or more in the reproduced audio data, and controls the disk recorder, when the silent portion is deleted, so as to record data indicating the divisional point between respective audio data at the position forward by a predetermined time from the leading portion of audio data recorded after the silent portion. Accordingly, it is possible to automatically divide audio data recorded on the disk.

For this reason, the labor to manually divide audio data recorded on the disk can be saved.

I claim:

1. A voice recording and reproducing apparatus, comprising:

recording and reproducing means for recording an audio signal representing a plurality of sentences on a disk-shaped recording medium and for reproducing the recorded audio signal from said disk-shaped recording medium, and for recording start and end addresses for each of said sentences on said disk-shaped recording medium and for reproducing the recorded start and end addresses from said disk-shaped recording medium;

input means for receiving a sentence end reproduction indication signal; and control means for controlling said recording and reproducing means so as to reproduce a predetermined length of said recorded audio signal representing a terminating portion of one of said sentences in response to said sentence end reproduction indication signal.

2. A voice recording and reproducing apparatus as set forth in claim 1, wherein said disk-shaped recording medium is a hard disk.

3. A voice recording and reproducing apparatus as set forth in claim 1, wherein said disk-shaped recording medium is a magneto-optical disk.

4. A voice recording and reproducing apparatus as set forth in claim 1, wherein a group of said plurality of sentences represented by said audio signal forms a text segment.

5. A voice recording and reproducing apparatus as set forth in claim 1, further comprising:

speaker means for converting the recorded audio signal as reproduced by said recording and reproducing means to an acoustic signal; and microphone means for converting an acoustic signal representing a voice to said audio signal and for supplying said audio signal to said recording and reproducing means for recording thereby on said disk-shaped recording medium.

6. A voice recording and reproducing apparatus as set forth in claim 5, further comprising:

first buffer memory means for temporarily storing said recorded audio signal as reproduced by said recording and reproducing means and for supplying the temporarily stored audio signal to said speaker means; and second buffer memory means for temporarily storing the converted audio signal produced by said microphone means and for supplying the temporarily stored converted audio signal to said recording and reproducing means.

7. A voice recording and reproducing apparatus as set forth in claim 1, wherein said input means is also operative to receive a variable speed reproduction indication signal; and said control means is also operative to control a reproduction speed of said recording and reproducing means as a function of said variable speed reproduction indication signal.

8. A voice recording and reproducing apparatus as set forth in claim 7, wherein said control means is operative to control said recording and reproducing means so as to repeatedly reproduce selected portions of said recorded audio signal as a function of said variable speed reproduction indication signal.

9. A voice recording and reproducing apparatus as set forth in claim 1, wherein said input means is also operative to receive a division signal, an advance fine adjustment signal and a reverse fine adjustment signal; said recording and reproducing means is also operative to record divisional points between said sentences on said disk-shaped recording medium; and said control means is also operative to control said recording and reproducing means to record one of said divisional points in response to said division signal, to advance a position of one of said divisional points in response to said advance fine adjustment signal, and to retard a position of one of said divisional points in response to said reverse fine adjustment signal.

10. A voice recording and reproducing apparatus, comprising:

recording and reproducing means for reproducing a first audio signal representing a plurality of sentences from a disk-shaped recording medium, for recording a second audio signal representing operator utterances onto said disk-shaped recording medium, and for reproducing said second audio signal from said recording medium;

input means for receiving a recording and reproducing mode indication signal; and control means responsive to said recording and reproducing mode indication signal for controlling a repetitive sequence of the reproducing of said first audio signal and the recording and reproducing of said second audio signal by said recording and reproducing means, each repetition of said repetitive sequence including at least recording of said second audio signal and reproducing of at least one of said first and second audio signals.

11. A voice recording and reproducing apparatus, comprising:

recording and reproducing means for reproducing a first audio signal representing a plurality of sentences from a disk-shaped recording medium, for recording a second audio signal representing operator utterances onto said disk-shaped recording medium, and for reproducing said second audio signal from said recording medium;

input means for receiving a recording and reproducing mode indication signal indicating a mode chosen from at least one of:

a first mode in which each said repetition includes reproducing said first audio signal followed by recording said second audio signal;

a second mode in which each said repetition includes reproducing said first audio signal followed by recording said second audio signal and then by reproducing the just recorded second audio signal;

a third mode in which each said repetition includes reproducing a first portion of said first audio signal followed by recording said second audio signal, followed in turn by omitting reproduction of a second portion of said first audio signal and then by reproducing a third portion of said first audio signal, said first, second and third portions of said first audio signal representing first, second and third sentences, respectively;

a fourth mode in which each said repetition includes reproducing a selected portion of said first audio signal followed by recording an initial portion of said second audio signal, followed in turn by reproducing the just recorded initial portion of said second audio signal and then by again reproducing said selected portion of said first audio signal, and finally followed by recording a subsequent portion of said second audio signal; and a fifth mode in which each said repetition includes recording said second audio signal followed by reproducing the just recorded second audio signal; and control means responsive to said recording and reproducing mode indication signal for controlling a repetitive sequence of the reproducing of said first audio signal and the recording and reproducing of said second audio signal by said recording and reproducing means, each repetition of said repetitive sequence including at least recording of said second audio signal and reproducing of at least one of said first and second audio signals.

12. A voice recording and reproducing apparatus, comprising:

recording and reproducing means for recording an audio signal representing a plurality of sentences on a disk-shaped recording medium and for reproducing the recorded audio signal from said disk-shaped recording medium, and for recording start and end addresses for each of said sentences on said disk-shaped recording medium and for reproducing the recorded start and end addresses from said disk-shaped recording medium;

input means for receiving a skip indication signal; and control means for controlling said recording and reproducing means in response to said skip indication signal so as to alter by a predetermined interval a position on said disk-shaped recording medium from which said recorded audio signal is reproduced.

13. A voice recording and reproducing apparatus, comprising:

recording and reproducing means for recording an audio signal representing a plurality of sentences on a disk-shaped recording medium and for reproducing the recorded audio signal from said disk-shaped recording medium, and for recording start and end addresses for each of said sentences on said disk-shaped recording medium and for reproducing the recorded start and end addresses from said disk-shaped recording medium;

input means for receiving a skip indication signal and a quick skip signal; and control means for controlling said recording and reproducing means in response to said skip indication signal so as to alter by a predetermined interval a position on said disk-shaped recording medium from which said recorded audio signal is reproduced, and for controlling said recording and reproducing means in response to said quick skip signal so as to alter by a respective interval a position on said disk-shaped recording medium from which said recorded audio signal is reproduced, said respective interval associated with said quick skip signal being substantially smaller than said predetermined interval associated with said skip indication signal.

14. A voice recording and reproducing apparatus, comprising:

recording and reproducing means for recording an audio signal representing a plurality of sentences on a disk-shaped recording medium and for reproducing the recorded audio signal from said disk-shaped recording medium, and for recording divisional points between said sentences on said disk-shaped recording medium;

input means for receiving a sentence automatic division indication signal; and control means responsive to said sentence automatic division indication signal for controlling said recording and reproducing means so as to reproduce said recorded audio signal, for detecting a silent portion of at least a predetermined duration and a subsequent audio portion following said silent portion in the reproduced recorded audio signal, and for controlling said recording and reproducing means so as to record one of said divisional points between sentences at a position preceding by a predetermined interval said subsequent audio portion.

15. A voice recording and reproducing apparatus as set forth in claim 14, wherein a group of said plurality of sentences represented by said audio signal forms a text segment.

* * * * *